T. E. C. Brinly,
Broom.
No. 113,845.  Patented Apr. 18, 1871.
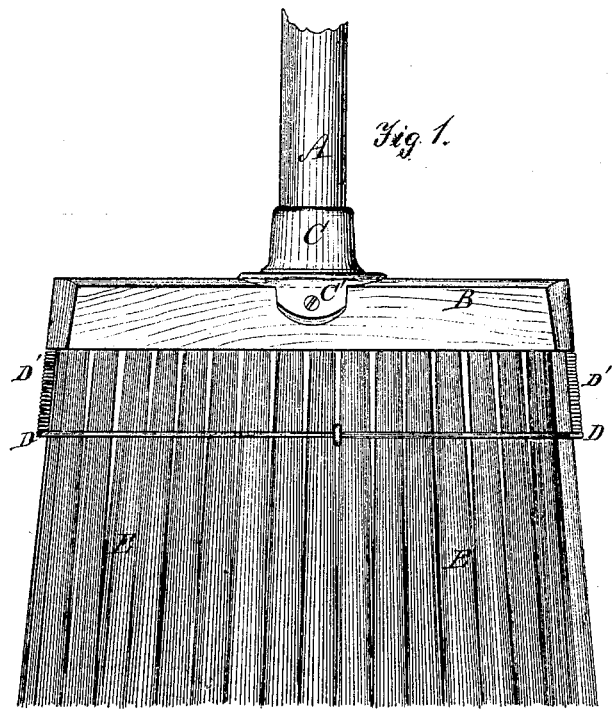
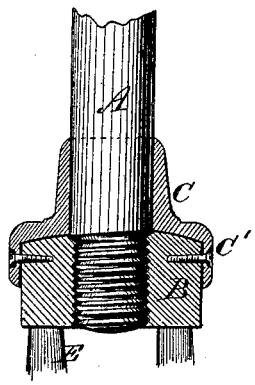

United States Patent Office.

THOMAS E. C. BRINLY, OF LOUISVILLE, KENTUCKY, ASSIGNOR TO TYLER, BROWN & CO.

Letters Patent No. 113,845, dated April 18, 1871.

IMPROVEMENT IN BROOMS.

The Schedule referred to in these Letters Patent and making part of the same.

*To all whom it may concern:*

Be it known that I, THOMAS E. C. BRINLY, of Louisville, in the county of Jefferson, and State of Kentucky, have invented a certain Improvement in Brooms; and I do hereby declare that the following is a full, clear, and exact description thereof, reference being had to the annexed drawing making part of this specification, in which—

Figure 1 is an elevation of my improved broom, showing a section of the handle, the cross-head in which the broom-corn is inserted, the socket through which the handle passes, and the wires which support the corn or brush.

Figure 2 is a transverse sectional elevation, showing the handle, socket, and cross-head.

Corresponding letters refer to corresponding parts in the several figures.

This invention relates to that class of brooms which have a screw formed upon the end of the handle which enters the cross-head; and It consists in combining with such handle and cross-head a ferrule, as will be more fully explained hereinafter.

To enable those skilled in the art to make and use my invention, I will proceed to describe its construction and operation.

A refers to the handle, which may be of any desired form, but which is provided with a screw-thread upon its lower end for aiding in attaching it to the cross-head B, which consists of a piece of wood or metal, the lower surface of which is perforated with a series of holes for the reception of the broom-corn or brush, and has an aperture in its upper surface which is provided with a female screw-thread for the end of the handle.

In order that the handle and cross-head may be more firmly united than they have heretofore been, a metallic ferrule or socket, C, is attached to the cross-head by means of screws which pass through ears C', as shown in the drawing.

The upper portion of this socket extends upward for any required distance, and is provided with an aperture through which the handle passes, and in which it fits snugly for the purpose of strengthening the same and preventing it from being broken off at or near the point where it leaves the cross-head.

For the support of the corn or brush of the broom a band of wire, D, is made to surround the same, which is attached to the cross-head by means of vertical wires D' D', as shown in fig. 1 of the drawing.

I am aware that brooms have heretofore been made which have had a handle screwed into a cross-head which was provided with a series of holes for the reception of the corn or brush, and that wires have been applied for the support of such corn in a manner similar to that employed by me.

I do not, therefore, claim any of the parts of which my improved broom is composed, when separately considered; but What I do claim as my invention, and desire to secure by Letters Patent, is—

The combination of the screw-threaded handle A, the cross-head B, and the metallic socket C, all constructed and arranged substantially as and for the purpose set forth.

In testimony whereof I have signed my name to this specification in the presence of two subscribing witnesses.

T. E. C. BRINLY.

Witnesses:
I. EDWARD HARDY,
JAMES B. HARDY.